(12) United States Patent
Ishihara et al.

(10) Patent No.: US 7,758,245 B2
(45) Date of Patent: Jul. 20, 2010

(54) ROLLING GUIDE UNIT WITH SEPARATOR INTERPOSED BETWEEN ANY TWO ADJACENT ROLLING ELEMENTS

(75) Inventors: Toyohisa Ishihara, Kamakura (JP); Takashi Tanimoto, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 751 days.

(21) Appl. No.: 11/376,170

(22) Filed: Mar. 16, 2006

(65) Prior Publication Data

US 2006/0222274 A1    Oct. 5, 2006

(30) Foreign Application Priority Data

Mar. 31, 2005    (JP) .............................. 2005-102850

(51) Int. Cl.
*F16C 19/00*    (2006.01)
*F16C 19/20*    (2006.01)
(52) U.S. Cl. ......................................... 384/51; 384/521
(58) Field of Classification Search .................. 384/43, 384/50, 51, 521, 522, 523, 526, 551
See application file for complete search history.

(56) References Cited

U.S. PATENT DOCUMENTS

| | | | | |
|---|---|---|---|---|
| 1,405,894 A | * | 2/1922 | Borg | 384/520 |
| 4,175,805 A | * | 11/1979 | Becker et al. | 384/520 |
| 4,761,820 A | | 8/1988 | Frank et al. | |
| 6,412,983 B1 | * | 7/2002 | Ishihara | 384/45 |
| 6,813,968 B2 | * | 11/2004 | Miyaguchi et al. | 74/424 |

FOREIGN PATENT DOCUMENTS

| | | |
|---|---|---|
| JP | 63-111316 | 5/1988 |
| JP | 2001-124075 A | 5/2001 |
| JP | 2003-22128 A | 8/2003 |
| JP | 2003-239964 A | 8/2003 |

* cited by examiner

*Primary Examiner*—Thomas R Hannon
*Assistant Examiner*—James Pilkington
(74) *Attorney, Agent, or Firm*—Browdy and Neimark, PLLC

(57) ABSTRACT

A rolling guide unit has a separator to adjust an interval between any two adjacent rolling elements. The separator is made to have flexibility or elasticity enough to afford any desired elastic deformation, even with keeping sufficient mechanical stiffness or rigidity to positively admit the interaction among the rolling elements inclusive of a circular shell. The separator is comprised of axially opposite end sides depressed inward to fit over the adjacent rolling elements, a circular shell to define an outside contour of the separator, and fingers lying in the depressions in a way extending from the shell towards centers of the depressions so as to make elastic contact with the rolling elements. Each finger has a surface facing the associated rolling element, the surface being made into any one of a depressed spherical surface, a depressed conical surface and a depressed pyramid surface.

4 Claims, 4 Drawing Sheets

ROLLING GUIDE UNIT WITH SEPARATOR INTERPOSED BETWEEN ANY TWO ADJACENT ROLLING ELEMENTS

FIELD OF THE INVENTION

The present invention relates to a rolling guide unit adapted to linear motion guide systems comprised of a guide rail having a raceway groove and a slider movable on the guide rail by virtue of more than one rolling element or rolling-contact bearings made up of an outer ring and an inner ring. More particular, it relates to a rolling guide unit having a constructional feature in a separator interposed between any leading rolling element and trailing rolling element to roll through a circulating circuit together with the rolling elements.

BACKGROUND OF THE INVENTION

Modern advanced technology extensively requires various sorts of machine elements including rolling-contact bearings and linear motion guide systems. Especially, the linear motion guide systems have become popular in a diversity of machines including semiconductor production machines, various assembly machines, and so on, which are needed to work with high performance in operating speed and cycle. To cope with this, machine elements, especially the modern linear motion guide systems are also required to make smooth motion with less noise to live up to high moving velocity and high cyclic operation of the machines.

With the rolling guide units used in the conventional linear motion guide systems, a diversity of separators has come to practical use in the circulating circuits to keep the rolling elements against direct contact with each other. Among the prior separators used in the linear motion guide systems, a flexible separator is known in which the separator is allowed to deform elastically for itself to regulate any interval between any two adjacent rolling elements. Recent operating environment for the linear motion guide systems, nevertheless, is looking to the separator that is rich in mechanical stiffness even though flexible in elastic deformation.

In the commonly assigned Japanese Patent Laid-Open No. 2001-124075, there is disclosed a rolling guide unit in which separators are placed between any leading and trailing rolling elements, the separators being each composed of a major central body and elastic supports arranged around the major central body on axially opposite circular edges, three on each edge, in such a way that any two adjoining supports are raised oppositely to each other in the axial direction of the separator, making it possible to compensate for the variances in length of the circulating passage with the separator upon loading of the rolling elements in the circulating circuit. With the rolling guide unit constructed as stated earlier, the separator lying between any two adjacent rolling elements is especially composed of the major central body and elastic supports extending radially around the major central body, the elastic supports being made up of elastically deformable parts made around the periphery of the major central body and distal seats integral with the elastically deformable parts so as to spread in radial direction. The separator comes into engagement with the associated rolling elements at only the distal seats thereof when the pressure exerted on the rolling elements to press them against each other is relatively less. In contrast, when the pressure recited earlier is larger, the elastically deformable parts get back to bring the separator into close engagement with the associated rolling elements around the circular periphery thereof.

An elastic spacer for ball bearings is disclosed in U.S. Pat. No. 4,761,820 (JP Laid Open No. S63-111316) in which the spacer is inserted between adjacent balls in such a way making a substantially punctiform contact with any one of the adjacent balls while a circular-line contact with another rolling element. The prior elastic spacer has an outer contour inscribed in a cylinder and its length corresponding to at least one half the diameter of the ball. The spacer also has in its bore a conical partition which, in its central region contiguous to the cone tip, is subdivided into elastically resilient tongues by slots extending approximately radially, one ball making approximately punctiform contact and the other ball abutting on the partition in a contact circle.

Another linear motion guide system is disclosed in Japanese Patent Laid-Open No. 2003-239964, in which a separator is designed to have enough resilient force without using any specific material rich in elasticity to ensure the improvement in working performance of the linear motion guide system, which is composed of a guide rail, a slider movable relatively to the guide rail, and more than one rolling element allowed to roll through a circulating circuit made up of a load-carrying race and a non-loaded return passage. The separator interposed between any two adjacent rolling elements is made on opposite sides thereof with circular surfaces where the rolling elements make rolling-contact with there. The circular surfaces are each made to an arc of contact different from one another.

In another Japanese Patent Laid-Open No. 2003-222128, there is disclosed a unidirectional actuator in which rolling elements or balls are kept against collision, which might otherwise any noise or adverse vibration, to thereby improve the durability. With the unidirectional actuator recited earlier, separators of synthetic resin are interposed between any leading and trailing rolling elements to keep the rolling elements against collision with one another during traveling motion.

Nevertheless, the separator in the rolling guide unit disclosed in the commonly assigned senior Japanese patent application recited earlier, through rich in resiliency or elasticity, is forced to make the elastically deformable area thereof small in return for encouraging the mechanical stiffness or rigidity. Moreover, the elastic spacer for ball bearings recited earlier is lack of flexibility for elastic deformation, and apt to get an interval between the adjoining rolling elements more spreading out, so that the rolling elements lying in the load-carrying area are reduced in number, with the result of reduction in their load capacity. Besides, the elastic spacer made as stated earlier is complicated in construction and, therefore, very tough in production. With most linear motion guide units constructed as stated earlier, the prior separator interposed between the leading and trailing rolling elements is made to come on the opposite circular surfaces thereof into rolling contact with the rolling elements at local areas asymmetric with one another on the opposite circular surfaces. As a result of the asymmetric contact with the rolling elements on the opposite circular surfaces, the prior separator is less in amount of elastic deformation than it should be for large force to deform elastically the separator. Such prior separator is more likely to develop a problem for the following accuracy desired for a roll-contact working on the associated rolling elements

SUMMARY OF THE INVENTION

The present invention, therefore, has as its primary object to overcome the major problem in relation with a separator interposed between any two adjacent rolling elements installed in a circulating circuit. More particular, it provides a separator adapted well to a rolling guide unit including a linear motion guide system, ball nut-screw arrangement, rolling-contact bearing, and so on, which has the circulating circuit to allow the rolling elements rolling through there. Further, the present invention is envisaged the provision of a rolling guide unit with a separator that has an adequate resistance against an elastic deformation loaded by the rolling elements being running, and also makes sure of an amount of elastic deformation so much as not to thwart the roll working of the rolling elements.

The present invention is concerned with a rolling guide unit including more than one rolling element allowed to roll through a circulating circuit defined between confronting members movable relatively to one another, and a separator disposed between any adjacent rolling elements to keep them against contact with each other, the separator being allowed to make elastic deformation to regulate an interval between the adjacent rolling elements; wherein the separator is comprised of a right circular cylindrical shell to define an outside cylindrical contour of the separator, depressions made on opposite end sides of the separator to fit over the adjacent rolling elements, and fingers lying in the depressions in a way extending from the shell towards centers of the depressions so as to make elastic contact with the rolling elements.

In one aspect of the present invention, a rolling guide unit is disclosed in which the fingers come into rolling contact with their associated rolling elements over their surfaces, which are made in either any one surface having a constant radius of curvature selected from a depressed spherical surface, a depressed conical surface and a depressed pyramid surface or a composite surface.

In another aspect of the present invention, a rolling guide unit is disclosed in which the fingers are made up of a first finger extending from any one of the opposite end sides of the separator and a second finger extending from another end side, the first and second fingers being arranged alternately in a circular direction and made staggered from one another with respect to a radial transverse section of the separator. In a further another aspect of the present invention, there is disclosed a rolling guide unit in which the separator has three pieces of the first finger and three pieces of the second finger.

In another aspect of the present invention, a rolling guide unit is disclosed in which the depressed spherical surface made in the separator has a radius of curvature that is smaller than that of the rolling element, and also has a center that is set-off center from a center of the separator. In another aspect of the present invention, a rolling guide unit is disclosed in which the separator is punched out at the center thereof to make a central aperture, making the fingers free at their distal ends from one another.

In another aspect of the present invention, a rolling guide unit in which the adjacent fingers are separated from one another with a slit to make elastic deformation independent of each other. As an alternative, the slit separating the adjacent fingers apart from one another gets splayed out at boundary between the shell and the associated fingers to reduce the fingers in circular dimension at their circular proximal areas.

In another aspect of the present invention, a rolling guide unit is disclosed in which the finger is scooped out on the backside thereof.

In a further another aspect of the present invention, there is disclosed a rolling guide unit adapted to the a linear motion guide system in which one of the confronting members movable relatively to one another is a guide rail having a lengthwise raceway groove thereon, and another is a slider having a raceway groove in opposition to the raceway groove on the guide rail, the slider being allowed to move relatively to the guide rail in a sliding manner by virtue of the rolling elements.

With the rolling guide unit constructed as stated earlier, the fingers in the separator are allowed to experience elastic deformation owing to the interaction among the rolling elements to adjust the interval between the adjacent rolling elements. Where the rolling elements are packed closely up to the most huddled condition, the depressed spherical surfaces defined in the circular shell come entirely into contact around the most outlying peripheries thereof with their associated rolling elements while the fingers are urged into rolling-contact on their backside thereof with other rolling elements in a way their free distal ends thereof make rolling-contact on both opposite sides with the two adjacent rolling elements. Thickness across the finger, thus, ensures the least interval between the leading and trailing rolling elements and at the same time the interaction among the rolling elements can be positively admitted by the fingers inclusive of the shell. Thus, the separator is made to have the flexibility or elasticity enough to afford the desired elastic deformation, even with keeping the sufficient mechanical stiffness or rigidity. The separator in the circulating circuit, moreover, serves to provide an ample space to reserve lubricant, which is sufficient in amount to make sure of long-lasting smooth circulation of the rolling elements without lubrication failure. The separator in the circulating circuit keeps the interval between the adjacent rolling elements to a minimum and correspondingly makes it possible to boast the most allowable rolling elements, helping minimize the influence on load-carrying capacity.

Moreover, the separator constructed according to the present invention may be varied in elasticity by only somewhat modification of the shape or profile thereof so as to keep the optimal performance of the separator, depending on the fashions of machine elements including the rolling guide units to which the separator is installed.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Referring now in detail to the drawings, the rolling guide unit of the present invention with a separator interposed between any adjacent rolling elements in a circulating circuit will be explained below. The separator constructed according to the present invention is well adapted for use in various sorts of machine elements including, for example linear motion guide systems, rolling-contact bearings, and so on, which have the circulating circuits to allow the rolling elements running through there, making sure of smooth reciprocating motion with accuracy between any relatively moving components in machinery as diverse as semiconductor fabricating equipment, assembly machines, inspection instruments, medical instruments, measurement/inspection instruments, and so on. The rolling guide unit with the separator constructed according to the present invention is especially suited to operate the semiconductor fabricating equipment under high-speed, high-cyclic operating condition.

The separator in the illustrative version, although explained installed in the circulating circuit for the rolling elements in the linear motion guide system, may easily fit into the circulating circuit in other machine elements including a ball nut-screw arrangement, a rolling-contact bearing having an outer and inner ring.

Figure 1:
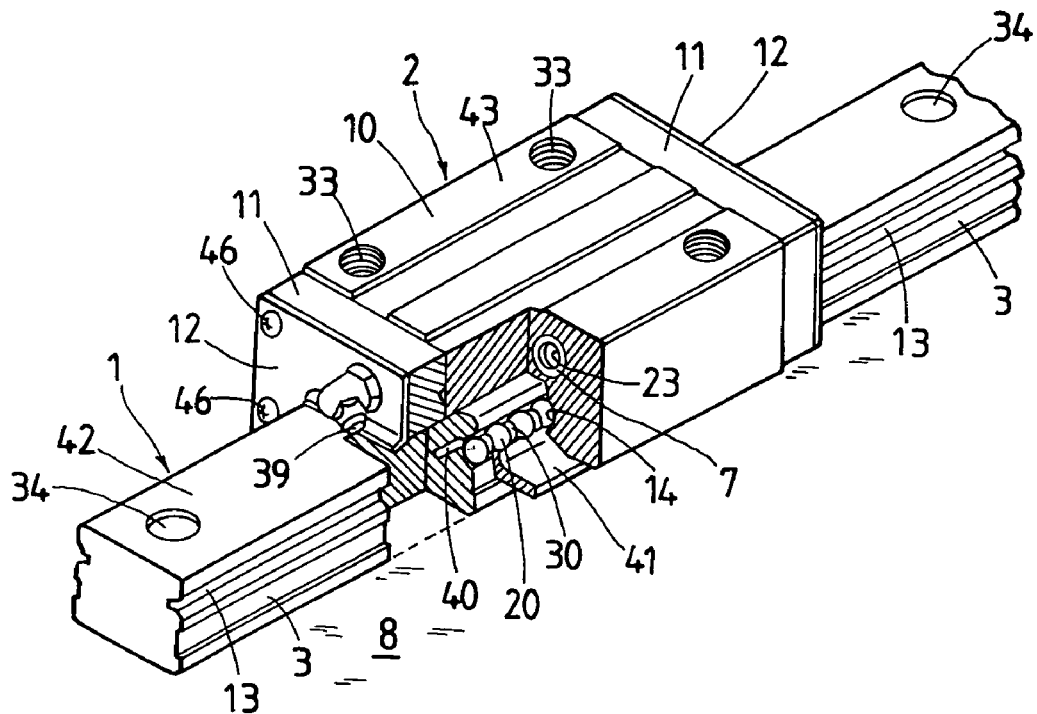
FIG. 1 is a perspective view, partially broken away, showing a preferred embodiment of a linear motion guide system with separators interposed between any leading and trailing rolling elements constructed according to the present invention.
Figure 2:
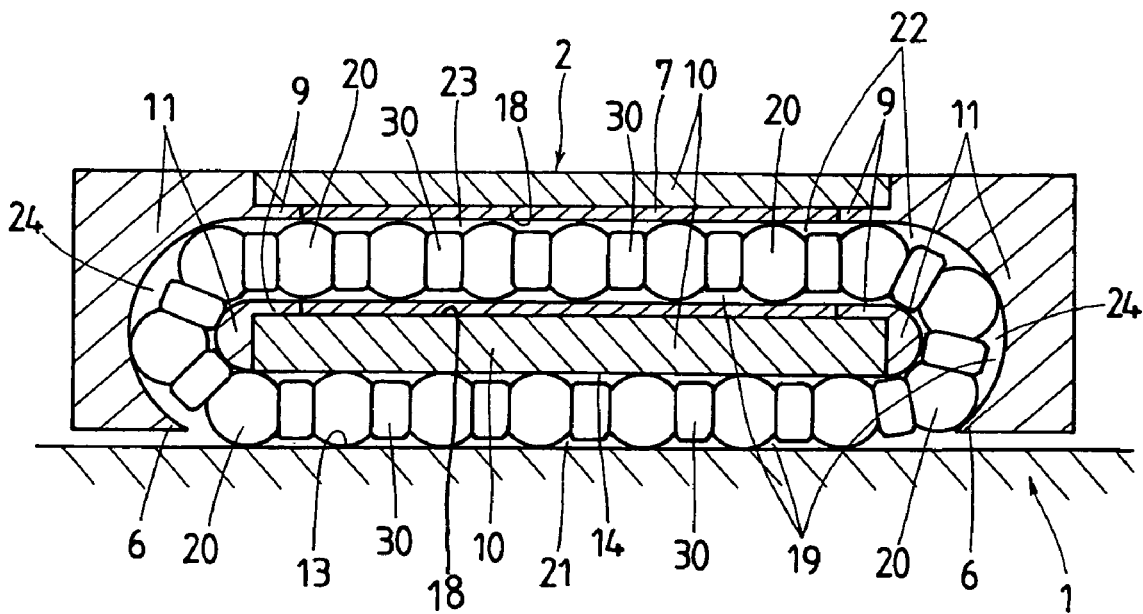
FIG. 2 is a view explanatory of a circulating circuit where the rolling elements are installed together with separators in the linear motion guide system of FIG. 1.

The rolling guide unit illustrated in FIGS. 1 and 2 is a version applied to the linear motion guide system. With the rolling guide unit, especially, a separator 30 is interposed between any two adjacent rolling elements 20 that roll through a circulating circuit 19 consisting of a load-carrying area and a non-loaded area. The separator 30 is made to get elastic deformation in itself, thereby keeping the adjacent rolling elements 20 against any direct contact with one another while adjusting an interval between any two adjacent rolling elements 20. The separator 30 is mainly comprised of axially opposite end surfaces 45, 47 depressed to make concaves or recesses 27 and 28 to fit over their associated rolling elements 20, one to each recess, a circular shell 5 to define an outside contour of the separator, a plurality of fingers 25 and 26, commonly identified by 4, extending inward from the circular shell 5 towards the centers of the concaves 27 and 28 so as to come into flexible contact with their associated rolling elements 20. The separator 30 is made on any one end surface 45 thereof with a first concave 27 while on the opposite side 47 with a second concave 28. Inside the first concave 27 of the separator 30, there are made some first fingers 25, three fingers shown in illustrative version, which are positioned at regular intervals around the curved surface of the circular shell 5. Inside the second concave 28, there are also made some second fingers 26, three fingers shown in illustrative version, which are positioned at regular intervals around the curved surface of the circular shell 5. The first and second fingers 25, 26 are each made to have deep basins 50, 51 lying on their back between circularly adjacent fingers.

Figure 6:
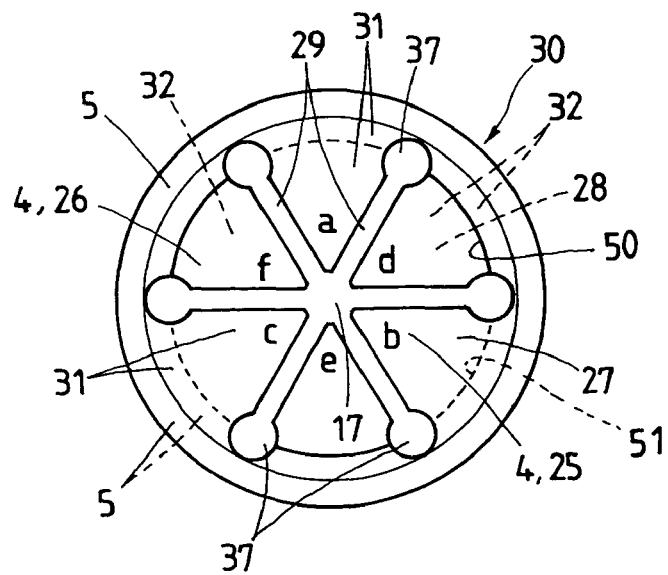
FIG. 6 is a view in any one side elevation of another version of the separator of FIG. 3.
Figure 7:
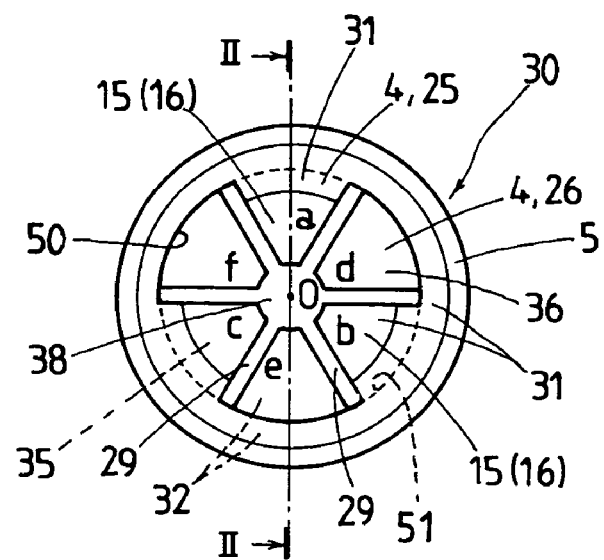
FIG. 7 is a view in any one side elevation of a further another version of the separator of FIG. 3.
Figure 8:
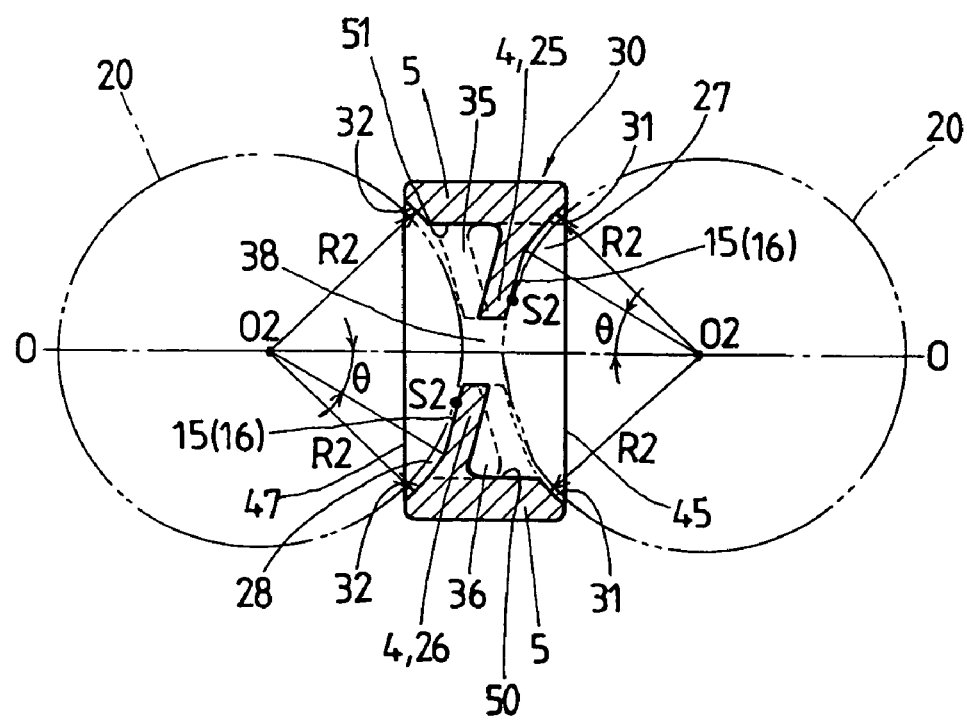
FIG. 8 is a view in transverse section of the separator as seen along the line II-II of FIG. 7.

The fingers 25, 26 of the separator 30 will come into rolling contact with their associated rolling elements 20 over their surfaces, which are made in either any one surface having a constant radius of curvature (refer to FIGS. 4 to 6) selected from a depressed spherical surface 31, 32, a depressed conical surface 15 (shown in FIGS. 7 and 8), and a depressed pyramid surface 16 (shown in FIGS. 7 and 8) or a composite surface (shown in FIGS. 7 and 8). With the separator 30 constructed as seen in FIG. 5, the first group of the three fingers 25a, 25b, 25c made on the one end surface 45 and the second group of the three fingers 26a, 26b, 26c on the other end surface 47 are made staggered from one another with respect to a radial transverse section of the separator 30. The depressed spherical surfaces 31, 32 in the separator 30, as shown in FIG. 5, have a radius of curvature (R1) that is smaller than that of the rolling element 20, and also have a center (01) that is set-off center by a distance (e) from a center line (0-0) extending through the center of the separator 30.

As seen in FIGS. 1 and 2, the linear motion guide system is mainly comprised of a guide rail 1 rectangular in transverse section and having lengthwise raceway grooves 13 on widthwise opposing sides 3 thereof, and a slider 2 having fore-and-aft raceway grooves 14 in opposition to the lengthwise raceway grooves 13 on the guide rail 1. The slider 2 fits over and conforms to the guide rail 1 for linear motion relatively to the guide rail 1 by virtue of the rolling elements 20. The guide rail 1 has some holes 34 opening on to a top surface 42 thereof at locations spaced lengthwise from each other. The guide rail 1 may be fixed together with any mounting base 8, such as a bed, machine base, work table, and so on by screwing bolts through the holes 34 of the guide rail 1 into mating openings in the mounting base 8. The slider 2 has a carriage 10 movable relatively to the guide rail 1, end caps 11 secured to the forward and aft ends of the carriage 10, one to each end, and end seals 12 secured on outward surfaces of the end caps 11.

Provided on an upper surface 43 of the carriage 10 are threaded openings 33 for mounting the slider 1 to other appliances, parts, chucks, grasping jaws or the like. Both the carriage 10 and the end caps 11 are made recessed fore-and aft over lower surfaces thereof to permit the slider 2 to conform on the guide rail 1 for relative movement. The raceway grooves 14 are cut in sidewise opposite inward surfaces around the fore-and aft recess in the slider 2.

With the linear motion guide system constructed as stated earlier, the rolling elements 20 of balls are installed to roll through a load-carrying race 21 defined between the raceway grooves 13 and 14 that are in opposition to each other. Moreover, retainer bands 40 are provided in the carriage 10 so as to hold the rolling elements 20 to thereby prevent the rolling elements 20 from falling out of the carriage 10. Bottom seals 41 are secured to the lower surface of the slider 2 to close clearances between the guide rail 1 and the slider 2. The carriage 10 is also provided at the lengthwise opposing ends thereof with some threaded openings for fastening screws 46 by which the end caps 11 and end seals 12 are secured to forward and aft ends of the carriage 10. Most linear motion guide systems use commonly lubricant such as grease or lubricating oil. With grease used, it is applied through a grease nipple 39 to turnaround passages 24 and return passages 23 where the rolling elements 20 roll through there. In contrast, lubricating oil may be supplied through any pipe joint, which are used substituting for the grease nipple 39.

The linear motion guide system, as shown in FIG. 2, includes a circulating circuit 19 to allow the rolling elements 20 running through in a circulating manner. The circulating circuit 19 is made up of the load-carrying race 21 defined between the raceway groove 13 in the guide rail 1 and the raceway groove 14 in the slider 2, and a non-loaded area 22 composed of a return passage 23 made in the carriage 10 and turnaround passages 24 cut in the end caps 11. The return passage 23 is made in the carriage 10 to extend in parallel with the load-carrying race 21. The turnaround passages 24 are each made curved to connect together the load-carrying race 21 and the return passage 23 with one another. Thus, the circulating circuit 19 constructed as stated earlier provides a looped passage where the rolling elements 20, together with the separators 30 inserted between any two adjacent rolling elements 20, run through the load-carrying race 21 and the non-loaded area 22 as the slider 2 moves relatively to the guide rail 1. The rolling elements 20, after running through the load-carrying race 21, come in the turnaround passage 24 in any one of the end caps 11. The rolling elements 20 further run from the turnaround passage 24 to the return passage 23 in the carriage 10. It will be thus understood that the rolling elements 20 roll though the load-carrying race 21, thereby allowing the slider 2 to move smoothly with respect to the guide rail 1. The end caps 11 are provided with claws 6 for scooping the rolling elements 20 out of the load-carrying race 21.

A tubular member 7 of cellular structure impregnated with lubricant fits into a fore-and-aft bore 18 in the carriage 10 to define the return passage 23 for the circulating circuit 19. Each end caps 11 has a circular spigot 9 that extends from the turnaround passage 24 into the associated return passage 23 to fit into a socket end of the fore-and-aft bore 18 in the carriage 10, coming into abutment against any associated one of the forward and aft ends of the tubular member 7 to make the joint without causing any difference in the return passage 23, completing the circulating circuit where the rolling elements 20 are allowed to roll with smoothness through there.

The separator 30 is made elastically deformable for itself and interposed between any two adjacent rolling elements 20 running in a circulating manner through the load-carrying area of the load-carrying race 21 and the non-loaded area inclusive of the return passage 23 and the turnaround passages 24 to protect the adjacent rolling elements 20 against direct contact with one another and at the same time to make an interval between the adjacent rolling elements 20 variable. With the illustrative version of the linear motion guide system, the separators 30 are installed in every interval between any two adjacent rolling elements 20. As an alternative, the separators 30 are installed in only some selected intervals while the prior separators having no elasticity used for other intervals. Moreover, the rolling elements 20 in the illustrative version are balls.

Figure 3:
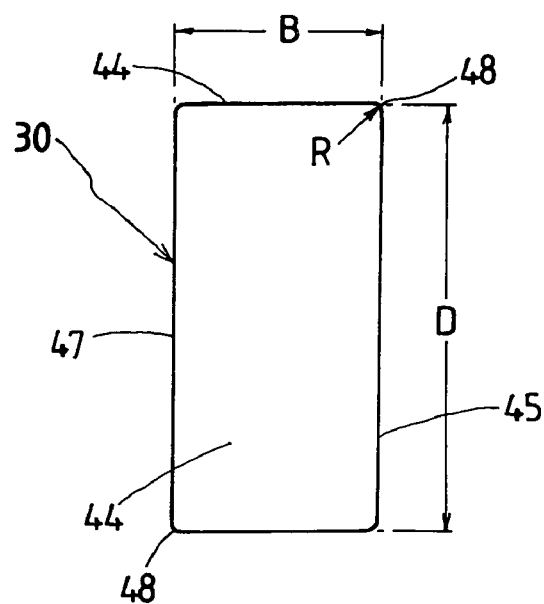
FIG. 3 is a view in front elevation of a separator interposed between any two adjacent rolling elements in the linear motion guide system of FIG. 1.
Figure 4:
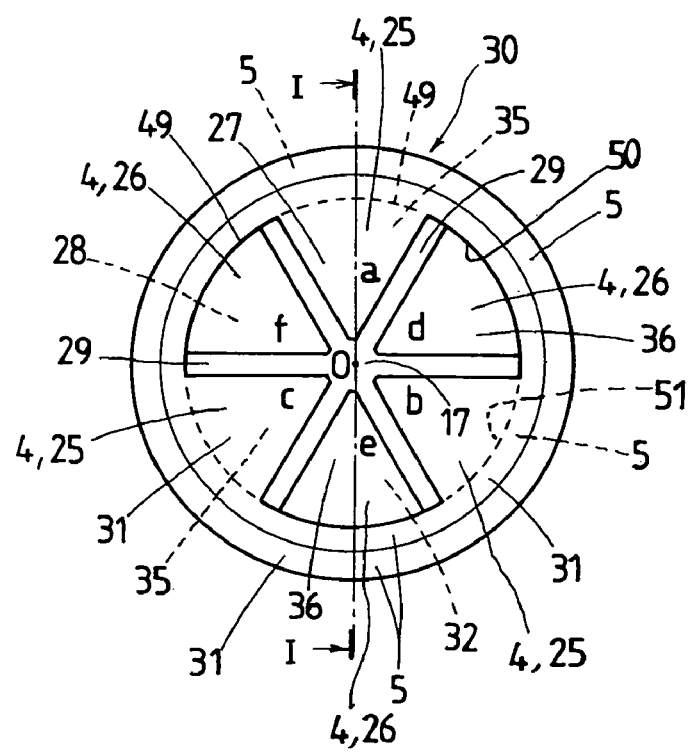
FIG. 4 is a view in any one side elevation of the separator of FIG. 3, in which the circular surface is made in a first version.
Figure 5:
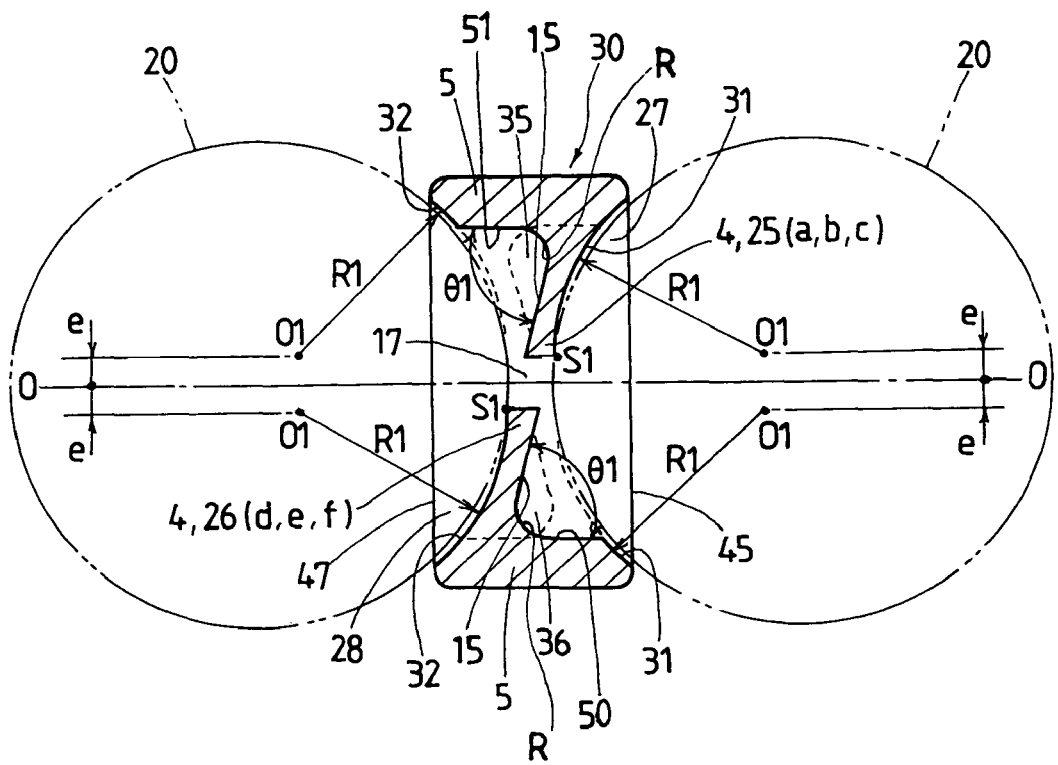
FIG. 5 is a view in transverse section of the separator as seen along the line I-I of FIG. 4.

As shown in FIGS. 3 to 5, the separator 30 is made of synthetic resin and has the form of right circular cylinder having a lateral surface 44 short in axial length in which an outside diameter (D) is larger than an axial length (B). The axially opposite circular end surfaces 45 and 47 of the separator 30 are made depressed to form the concaves 27 and 28. Axially opposite circular corners 48 of the separator 30 are made rounded at (R) to allow the separator 30 running through the circulating circuit 19 without causing any scratch. Inside the concaves 27 and 28, there are made some fingers 4 (25 and 26) that will come into elastic or flexible contact with their associated rolling elements 20. The fingers 4 are integral with the shell 5 at their radially outside edges 49 and extend inward from the circular shell 5 towards the center (0) of the separator 30 in conformity with the curved surfaces of the concaves 27 and 28.

The separator 30, when viewed from any one of the axially opposite end surfaces 45 and 47, is provided in the circular concaves 27 or 28 thereof with some radial slits 29, six in number in the illustrative version, which converge at the center (0) of the circular concaves 27 and 28. Each finger 4 is a piece of sectors provided by separating circularly each of the end surfaces 45 and 47 into equal parts, three equal parts in the illustrative version, with the deep basins 50 and 51. The fingers 4 is made tapered towards the enter (0) to terminate in a free distal ends. The axially opposite circular end surfaces of the separator 30, when viewed in the transverse section, are each made to form a spherical surface 31 or 32, which is depressed to fit snugly over or conform to any one of the adjacent rolling element 20. The depressed spherical surfaces get receded at 35 or 36 on their backsides facing another rolling element 20 to make the deep basins 50 or 51, keeping the depressed spherical surfaces themselves apart from the another rolling element 20. Thus, the thin fingers 25 or 26 are formed to not come into contact with another rolling element at their circular proximal areas while making contact with the one rolling element facing their front surfaces. With the fingers 4 constructed as stated earlier, the equal fingers 25(a, b, c) separated with the deep basins 50 are made on the first concave 27 while the equal fingers 26(d, e, f) separated with the deep basins 51 are made on the second concave 28. The three equal fingers 25(a, b, c) and the three equal fingers 26(d, e, f) are disposed alternately in circular direction. The concaves 27 and 28 of the separator 30 terminate outwards into the common circular shell 5. The deep basins 50 are made on the one end surface 45 to separate the three equal fingers 25 apart from one another while other deep basins 51 are on another end surface 47 to separate other three equal fingers 26 apart from one another. Thus, the deep basins 50 on the first end surface 45 and other deep basins 51 on the opposing end surface 47 are placed in a way lying in coincidence with each other in circular direction. As a result, the slit 29 appears in a boundary between adjacent deep basins 50 and 51 where they are open to each other.

With the separator 30 of the present invention, the circular shell 5 is made integral with the fingers 4 so that the end surfaces 45 and 47 integral with the circular shell 5 include the radially outside edges 49 of the depressed spherical surfaces 31 and 32. As shown in FIG. 5, the depressed spherical surfaces 31 and 32 of the separator 30 is each made into a composite spherical surface where two spherical surfaces are combined together, each of which has a radius of curvature (R1) smaller than that of the rolling element 20 to make sure of positive contact at the distal ends of the fingers 25, 26 with the associated rolling elements 20, and also has a center (01) that is set-off center by a distance (e) from the center line (0-0). The separator 30 is placed between two adjacent rolling elements 20 in a way coming into contact at the first three fingers 25 (a, b, c) thereof with any one of the two rolling elements 20 while at the second three fingers 26 (d, e, f) thereof with another rolling elements 20. Moreover, the fingers 4 are allowed to experience elastic deformation or deflection under the interaction between the adjacent rolling elements 20 to vary the distance across the two adjacent rolling elements 20. When the rolling elements 20 are packed closely up to the most huddled condition permitted in the circulating circuit, the depressed spherical surfaces 31 and 32 defined in the circular shell 5 come entirely into contact around the most outlying peripheries thereof with their associated rolling elements 20 while the fingers 4 are urged into rolling-contact on their backside thereof with another rolling element 20 in a way their free distal ends thereof make rolling-contact on both opposite sides with the two adjacent rolling elements. Thickness across the finger 4, thus, ensures the least interval between the leading and trailing rolling elements 20 and at the same time the interaction among the rolling elements 20 can be positively admitted by the fingers 4 inclusive of the shell 5.

The fingers 4 of the separator 30, as shown in FIG. 5, are each scooped out at 35 or 36 on their backsides to provide inside circular surfaces to define the circular shell 5 of a preselected radial thickness, conical surfaces 15 spreading over the backsides of the fingers 4 with joining in the inside circular surfaces at an acute angle with each other to make the fingers thin in thickness, and proximal areas where the inside circular surfaces merge together with the conical surfaces 15 so as to form rounded intersections (R). The fingers 4 are arranged circularly in a way spaced apart from one another by the interval of each slit 29 while staggered between any two adjoining fingers 4 in axial direction. The fingers 4 all come into contact with the adjacent rolling elements 20 at a constant distance apart from the common center (0) across the adjacent rolling elements 20. The separator 30 is made at the center thereof with a central aperture 17 on which the slits 29 converge together. Thus, the separator 30 is made to have the flexibility or elasticity enough to afford the desired elastic deformation, even with keeping the sufficient mechanical stiffness or rigidity. The separator 30 in the circulating circuit 19, moreover, serves to provide an ample space to reserve lubricant, which is sufficient in amount to make sure of long-lasting smooth circulation of the rolling elements 20 without lubrication failure. The separator 30 in the circulating circuit 19 keeps the interval between the adjacent rolling elements 20 to a minimum, helping minimize the influence on load-carrying capacity, even compared with the other construction in which no separator 30 is interposed between the adjacent rolling elements 20.

Referring to FIG. 6 in which there is shown another version of the separator 30 installed in the rolling guide unit. Like the separator 30 in FIG. 4, the separation 30 in FIG. 6 is also shown in side elevation. As opposed to the separator 30 in FIG. 4, the radial slits 29 in the modified version of FIG. 6 get splayed out at their radially outside edges to reduce the fingers 4 in circular direction by cutting holes 37 at opposite sides of their circular proximal areas to give the fingers 4 further elasticity or flexibility.

A further another version of the separator 30 is shown in FIGS. 7 and 8. The alternative separator 30 is illustrated in FIG. 7 in side elevation as with FIG. 4 while in FIG. 8 in transverse section taken on the line II-II of FIG. 7. With the further modified separator 30 shown here, the fingers 4 are different in profile from the first separator 30 of FIG. 4. The modified finger 4 is defined with a concave 27 or 28, respectively, which has an outside circular area made into a depressed spherical surface 31 or 32 and a depressed conical surface 15 merging with the depressed spherical surface 31 or 32 while extending radially from a location biased somewhat more end-ward than the proximal to the distal end so as to raise somewhat the rolling element 20 above the concave 27 or 28. The finger 4 is scooped out at 35 or 36 on the backside thereof and punched out at the center thereof to make a central aperture 38. With this version, a center (02) across the centers of depressed spherical surfaces 31 and 32 falls in line with the center line (0)-(0) passing through the center of the separator 30. The fingers 4 will come into contact with the associated rolling elements 20 on their depressed spherical surfaces 15 at locations biased in radial direction somewhat more outward than the distal ends of the fingers 4. Thus, the separator 30 according to this modified version is more enhanced in elasticity or spring property compared with the first separator 30 of FIG. 4.

Thus, the separator 30 constructed according to the present invention may be varied in elasticity by only somewhat modification of the shape or profile, depending on the fashions of machine elements including the rolling guide units to which the separator 30 is installed. As an alternative to the separator 30 in which the finger 4 is defined with a concave 27 or 28, respectively, which has an outside circular area made into a depressed spherical surface 31 or 32 and a depressed conical surface 15 merging with the depressed spherical surface 31 or 32 while extending radially from a location biased somewhat more end-ward than the proximal to the distal end so as to raise somewhat the rolling element 20 above the concave 27 or 28, a further modified separator may be provided in which there is made a depressed pyramidal face, or a triangular surface, in place of the depressed pyramid surface 16.

What is claimed is:

1. A rolling guide unit which is adapted to a linear motion guide system having a guide rail having a lengthwise raceway groove there on and a slider having a raceway groove in opposition to the raceway groove on the guide rail, the slider being allowed to move relatively to the guide rail in a sliding manner, and comprises a plurality of rolling elements rolling through a circulating circuit including a load-carrying race between the guide rail and the slider and a separator, disposed between every two adjacent rolling elements to separate the adjacent and being elastically deformable to regulate an interval between the adjacent rolling elements;

wherein the separator comprises a right circular cylindrical shell to define an outside cylindrical contour of the separator and a plurality of tapered fingers elastically deformable independently of one another and extending from the cylindrical shell towards a center of the cylindrical shell so that free distal ends of the fingers make elastic contact with a respective rolling element;

wherein the right circular cylindrical shell has a first end and a second end axially opposite to one another, each of which has a spherical depression to fit over any one of the rolling elements in conformity with the fingers;

wherein the fingers include a first set of fingers extending from the first end of the cylinder and a second set of fingers extending from the second end;

wherein the first set of fingers and the second set of fingers are arranged alternatively in a circular direction and staggered from one another in an axial direction to form a slit separating the fingers from one another in circumferential and axial directions;

wherein each set of fingers comprises three fingers; and wherein the first end and the second end of the cylindrical shell make contact around their entire respective spherical depression with their associated rolling element when the fingers are axially deformed by the rolling element.

2. A rolling guide unit constructed as defined in claim 1, wherein surfaces of the fingers have a constant radius of curvature selected from a depressed spherical surface, a depressed conical surface and a depressed pyramid surface or a composite surface.

3. A rolling guide unit constructed as defined in claim 2, wherein the depressed spherical surface made in the separator has a radius of curvature that is smaller than that of the rolling element, and the depressed surface on the finger has a center that is offset from a center line of the separator to ensure contact of the distal ends of the fingers with their associated rolling element.

4. A rolling guide unit constructed as defined in claim 1, wherein the slit separating the adjacent fingers apart from one another is splayed out at a boundary between the shell and the associated fingers to reduce the fingers in circular dimension at there circular proximal areas.

* * * * *